No. 694,344. Patented Mar. 4, 1902.
C. W. BAIRD.
SIDE DELIVERY HAY RAKE.
(Application filed June 24, 1901.)
(No Model.)
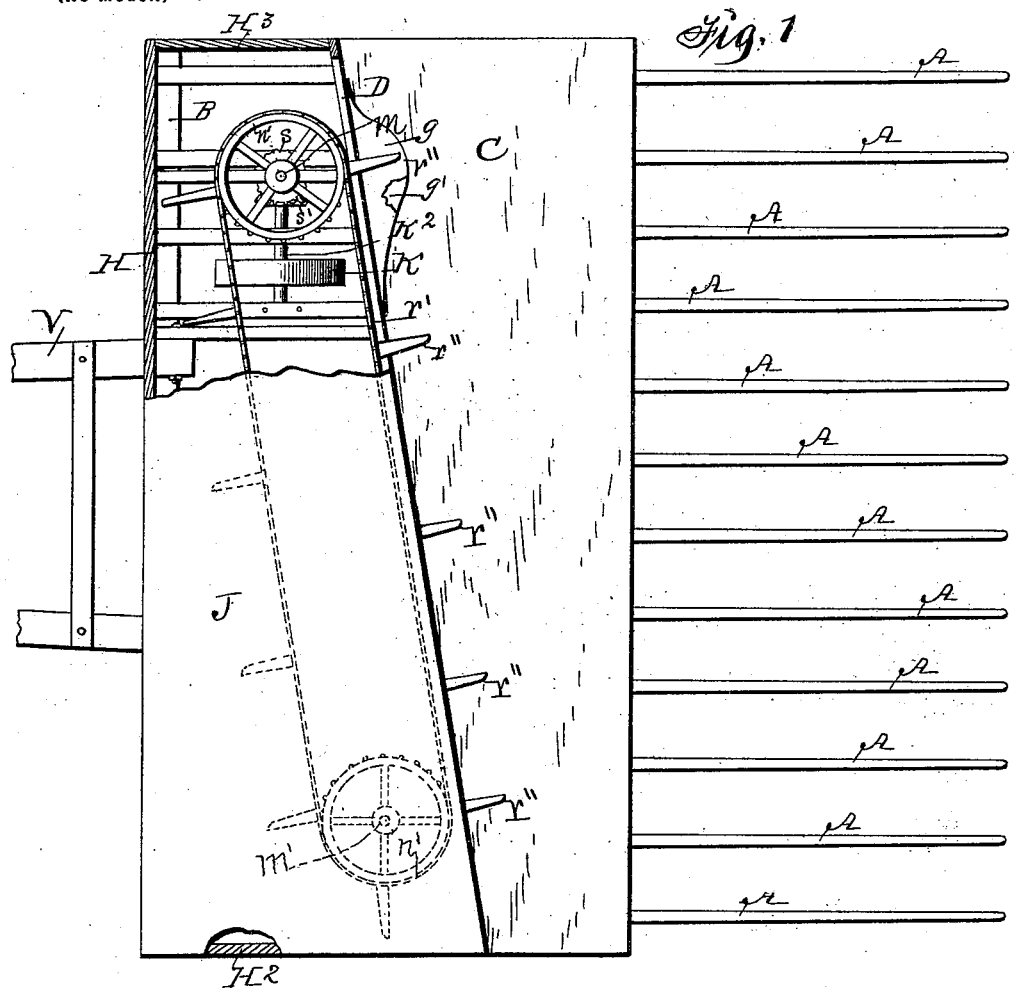
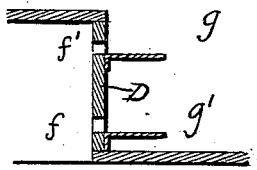
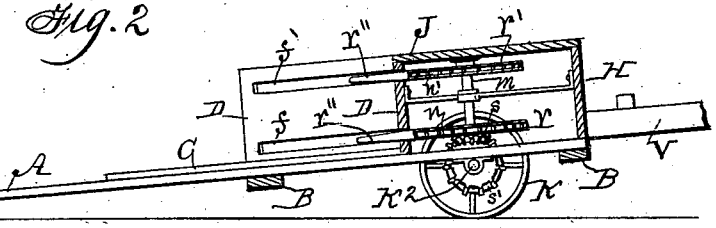
Witnesses:
Reuben G. Orwig
L. H. Orwig
Inventor: Charles W. Baird,
By Thomas G. Orwig, Atty.

UNITED STATES PATENT OFFICE.

CHARLES W. BAIRD, OF MILLERSBURG, IOWA.

SIDE-DELIVERY HAY-RAKE.

SPECIFICATION forming part of Letters Patent No. 694,344, dated March 4, 1902.

Application filed June 24, 1901. Serial No. 65,796. (No model.)

*To all whom it may concern:*

Be it known that I, CHARLES W. BAIRD, a citizen of the United States, residing at Millersburg, in the county of Iowa and State of Iowa, have invented a new and useful Side-Delivery Hay-Rake, of which the following is a specification.

My object is to provide an improved hay-rake adapted to be advanced across a field by horses hitched thereto in such a manner that hay gathered by the rake as it is moved forward will be compressed and delivered at the side of the line of advance into continuous rows adapted to facilitate forming haycocks or for loading the hay upon wagons for removal.

Heretofore an endless belt provided with fixed pins projecting outward has been mounted on a hay-rake to extend in a horizontal plane in rear of the teeth of a rake supported upon traction-wheels on the ends of an axle in such a manner that hay gathered by the rake would come in direct contact with the pins and belt to be moved laterally and fall off the endless belt at the end of the frame supporting the belt in a line between said frame and one of the traction-wheels. Endless chains having fixed fingers have been mounted in hay-loaders and harvesters to move hay and matter cut from the ground in various directions and devices connected therewith for preventing matter to adhere to the fingers; but in no instance has a wall projected vertically from the rear portion of a fixed platform on a hay-rake and longitudinal slots formed in the wall to allow endless chains mounted in rear of the wall to carry fingers in such a manner as to traverse the slots and to move hay gathered upon the platform by the rake-teeth laterally, as required, to deliver it in a row at the end of the platform and outside of one of the wheels upon which the platform and complete rake is supported and operated as contemplated by my side-delivery hay-rake.

My invention consists in the construction, arrangement, and combination of parts as hereinafter set forth, pointed out in my claims, and illustrated in the accompanying drawings, in which—

Figure 1 is a top view of the rake, showing parts broken away to disclose the positions of the operative parts relative to each other and the frame upon which they are mounted and inclosed. Fig. 2 is an end view of the machine, showing parts of the frame broken away to disclose the connection between the traction-wheel and the two endless chains that have fingers adapted to engage hay as it accummulates on the platform and to move it off the platform at the side of the rake and the line of advance as required to form rows across the field. Fig. 3 is a detail view showing slots in the wall to be traversed by the fingers on the endless chains and devices fixed to the wall to clear hay from the fingers at the end portion of the wall where the hay is dropped upon the ground.

The letters A designate straight wooden bars in parallel position and rigidly connected at their rear end portions by means of cross-bars B, fixed thereto by screw-bolts or in any suitable way to produce a rigid frame and base for supporting operating mechanism.

The front end portions of the bars A are tapered and not connected and adapted to serve as rake-teeth for gathering hay in the field.

A platform C is fixed on top of the central portions of the plurality of bars A.

D is the front wall of a case fixed on top of the parallel bars A in an inclined position, so as to narrow the platform at one end, as clearly shown in Fig. 1. Slots $f$ and $f'$ extend longitudinally in parallel position from near one end of the wall to its other end to allow fingers carried by endless chains to project out through the slots and to traverse the slots when the chains are in motion, and plates $g$ and $g'$ project forward at the sides of the slots, as shown in Fig. 1, to press hay from the fingers, as required to prevent hay being pulled into the slots.

H is the rear wall, and $H^2$ and $H^3$ the end portions, of the case fixed to the bars A, and J is the top of the case, fixed to the vertical parts of the case for inclosing the operative mechanism required for moving hay as it is gathered upon the platform and delivering it at the side of the machine as the machine is advanced.

A traction-wheel K is fixed to an axle $K^2$ and the axle mounted in bearings fixed to a number of the parallel straight bars A. A corresponding traction-wheel is mounted at the other end portion of the machine, but not shown.

Rotatable shafts $m$ and $m'$ are mounted in bearings fixed in the case to extend vertically and to support sprocket-wheels $n$ and $n'$ at different points of elevation, as shown in Fig. 2, for operating endless chains $r$ and $r'$, placed on the sprocket-wheels and provided with fingers $r''$, that project from chain-links at regular intervals of space to extend through and to traverse the slots in the front wall D of the case as required to retain the chains in horizontal planes and to engage and move hay gathered on the platform C and deliver it into a continuous row at the side of the rake.

To transmit power and motion from the traction-wheel K when the machine is in motion, the shaft $K^2$ is connected with the shaft $n$ by means of bevel-gears $s$ and $s'$.

V represents a portion of a frame fixed to the central and rear portions of the rake, as required for hitching horses thereto to push the rake forward and to gather hay in advance of the horses and deliver it in a continuous row at the side of the machine, so the ground upon which the horses tread will be cleared of hay by the rake, as required to prevent the horses from tramping upon hay.

Having thus described the purpose of my invention and the construction, arrangement, and combination of its various parts, the practical operation and utility of my invention will be readily understood by persons familiar with the art to which it pertains, and what I claim as new, and desire to secure by Letters Patent, is—

1. In a hay-rake, a transverse wall having longitudinal slots, fixed on the rear end portion of the rake to project vertically, fixed rake-teeth extending forward from the wall, a platform fixed in front of said wall to extend forward over the rake-teeth, wheels in rear of the platform for supporting the rear end portion of the rake elevated, endless chains in rear of the wall provided with fixed fingers to traverse said slots and means for operating said chains, arranged and combined to move hay over the platform and in front of said wall to deliver the hay at the side of the rake as the rake is advanced to gather hay.

2. In a machine or rake adapted for gathering hay, a frame supported upon traction-wheels partially under the frame, a plurality of parallel fixed rake-teeth, a fixed platform on top of the frame and rear end portions of the teeth at some distance from their free front ends, a wall having longitudinal slots fixed on the platform to project vertically and extend across the platform, endless carriers in rear of said wall provided with fingers, and means for operating the carriers connected with the traction-wheels, arranged and combined to operate in the manner set forth for the purposes stated.

3. In a machine for gathering and delivering hay at one side thereof as it is advanced in a field, a frame, traction-wheels mounted between the two parallel sides of the frame, a plurality of rake-teeth fixed in parallel position to the frame to project forward, a platform fixed on top of the frame and rear ends of the rake-teeth, a transverse wall fixed on the platform to project vertically, a slot in the wall extending horizontally to permit fingers carried by an endless chain to traverse the slot, an endless chain having fixed fingers in rear of the wall, means to press hay from the fingers at one end of said slot and means to actuate the chain in parallel line with the wall having the slot, arranged and combined to operate in the manner set forth for the purposes stated.

4. In a rake for delivering hay at the side of the line of advance, a frame mounted upon traction-wheels a plurality of rake-teeth projected forward from the frame, two shafts mounted on the frame to project vertically, a sprocket-wheel fixed to each one of said shafts, an endless chain placed on said sprocket-wheels and provided with fingers adapted to engage and move hay a wall in front of the chains provided with slots to be traversed by said fingers and means for actuating the sprocket-wheels, arranged and combined to operate in the manner set forth for the purposes stated.

5. A frame for a side-delivery hay-rake composed of a plurality of straight bars rigidly connected at their rear end portions and in parallel position, a platform fixed across the central portions of said straight bars and a case fixed on top of the said bars and in rear of said platform and the front wall of the case inclined relative to the ends of the case and line of advance and traction-wheels connected with the rear end portion of the frame to operate within the case and mechanism for moving hay from the platform in front of the inclined wall in the manner set forth, for the purposes stated.

6. In a hay-rake a frame mounted upon traction-wheels to extend over the wheels, shafts having fixed sprocket-wheels mounted in fixed bearings to project vertically, an inclined transverse wall having slots for the passage of fingers carried by endless chains, a platform in front of the inclined wall endless chains on said sprocket-wheels, fingers projecting from said chains to traverse the slots in said inclined wall to engage and move hay, bevel-gears connected with the axles of the traction-wheels and with the shafts projecting vertically, arranged and combined to operate in the manner set forth for the purposes stated.

7. A side-delivery hay-rake comprising a frame mounted upon traction-wheels to inclose the wheels, a plurality of rake-teeth projecting forward from the frame a platform fixed on the rake-teeth, a case fixed to the rear end of the platform to project vertically the front wall of the case inclined relative to the ends of the case and the line of advance and provided with longitudinal slots, fixed clearer-plates projecting forward at the sides of the slots, vertical shafts having fixed sprocket-wheels in bearings fixed to the frame, bevel-gears connecting the said shafts with the axle of the traction-wheels, chains on the sprocket-wheels, fingers projecting from links in the chain and means for hitching horses to the frame to push the machine forward, arranged and combined to operate in the manner set forth for the purposes stated.

8. A hay-rake for gathering hay into a row at the side of the rake comprising a frame composed of a plurality of rake-teeth and cross-bars fixed to the rear end portions of the teeth, traction-wheels within the frame on axles mounted in bearings fixed to the frame, a platform fixed on the rake-teeth in front of the traction-wheels, a wall fixed on the platform to extend diagonally across the platform in a vertical plane, one or more slots extending longitudinally in the wall, endless carriers mounted in rear of the slotted wall and provided with fingers to traverse the slots in the wall devices at one end portion of the wall for clearing the fingers, means connected with the traction-wheels for operating the endless carriers and means for hitching a horse thereto for advancing the rake in a field, arranged and combined to operate in the manner set forth for the purposes stated.

CHARLES W. BAIRD.

Witnesses:
 A. O. HATTER,
 S. N. KENNEDY.